United States Patent
Hessling et al.

(10) Patent No.: US 8,740,424 B2
(45) Date of Patent: Jun. 3, 2014

(54) LIGHT FOR AN AIRCRAFT

(75) Inventors: Andre Hessling, Koblenz (DE); Enrico Beier, Lippstadt (DE)

(73) Assignee: Goodrich Lighting Systems GmbH (DE)

( * ) Notice: Subject to any disclaimer, the term of this patent is extended or adjusted under 35 U.S.C. 154(b) by 8 days.

(21) Appl. No.: 13/475,127

(22) Filed: May 18, 2012

(65) Prior Publication Data

US 2012/0294021 A1    Nov. 22, 2012

(30) Foreign Application Priority Data

May 20, 2011   (EP) ..................................... 11166907

(51) Int. Cl.
*B64D 47/02*    (2006.01)

(52) U.S. Cl.
USPC ............................. 362/470; 362/518; 362/346

(58) Field of Classification Search
USPC ....................... 362/249.02, 470, 518, 346, 241
See application file for complete search history.

(56) References Cited

U.S. PATENT DOCUMENTS

| | | | |
|---|---|---|---|
| 1,245,120 A | 8/1918 | Ballman et al. | |
| 6,679,618 B1 | 1/2004 | Suckow et al. | |
| 7,527,390 B2 * | 5/2009 | Kakuta | 362/247 |
| 7,572,030 B2 | 8/2009 | Booth et al. | |
| 8,403,530 B2 * | 3/2013 | Singer et al. | 362/243 |
| 8,419,218 B2 * | 4/2013 | Dassanayake et al. | 362/249.02 |
| 2007/0164875 A1 | 7/2007 | Fredericks et al. | |
| 2008/0144328 A1 | 6/2008 | Yagi et al. | |
| 2010/0020538 A1 * | 1/2010 | Schulz et al. | 362/235 |
| 2010/0309681 A1 * | 12/2010 | Ohno | 362/543 |

FOREIGN PATENT DOCUMENTS

| | | |
|---|---|---|
| EP | 2119958 A1 | 11/2009 |
| WO | 2006092653 A1 | 9/2006 |

OTHER PUBLICATIONS

European Search Report for Application No. 11166907.3-2423: Date of mailing Nov. 25, 2011.

\* cited by examiner

*Primary Examiner* — Peggy A. Neils
(74) *Attorney, Agent, or Firm* — Cantor Colburn LLP (57) ABSTRACT

A light for an aircraft comprises a holder for carrying a plurality of light emitting diodes arranged along a curvilinear line and a first optical unit comprising an elliptic reflective partial surface defining a plurality of focal points forming a first curvilinear focal line extending along the light emitting sites of the light emitting diodes, and a plurality of second focal points. The light further includes a second optical unit comprising a single further focal point or a plurality of further focal points forming a further curvilinear focal line. The plurality of the second focal points of the first optical unit coincide and are identical to the single further focal point of the second optical unit or are located along the further curvilinear focal line of the second optical unit.

12 Claims, 4 Drawing Sheets

LIGHT FOR AN AIRCRAFT

FIELD OF THE INVENTION

The present invention relates to a light for an aircraft and, in particular, to an external light for an aircraft. While the present invention can be used primarily for each type of aircraft light, preferably the present invention is for an anti collision light or a head light of an aircraft. An example of a light for the interior of an aircraft is a seat or reading light.

DESCRIPTION OF THE PRIOR ART

In the past, in the technical field of aerospace applications, light sources have been based on gas discharge technology or filaments. For several years, aircraft lights based on LED technology have found ever stronger commercial use. Examples for LED-based aircraft lights for different purposes are disclosed in U.S. Pat. No. 6,679,618, U.S. Pat. No. 7,572,030, US-A-2007/0164875, WO-A-2009/156349, EP-B-1 217 663, EP-B-1 264 767, EP-B-1 552 983, EP-B-1 836 437, and GB-B-2,350,176.

In order to fulfill the official requirements of the Federal Aviation Association (FAA) with regard to the spatial light intensity distribution based on LED technology, a plurality of LEDs have to be arranged. In these designs, the available space and cooling capacities are only two of several concerns to be dealt with in order to obtain a high intensity light.

From U.S. Pat. No. 1,275,120 a projecting apparatus is known in which an ellipsoid reflector is used for illuminating a slide or film, i.e. a two-dimensional surface is illuminated to be projected on a projection screen or the like surface. Such a projection apparatus cannot be used in a lamp in which the light has to be directed in a pre-determined special light intensity distribution as in case of an aircraft light.

US-A-2008/0144328 discloses a light for an aircraft having a rather low profile structure comprised by reflectors having partial ellipsoidal reflector surfaces, and a defractive cover lens covering the light exit openings of the reflectors. Light sources are arranged in one of the focal points of a pair of partially ellipsoidal reflector surfaces while the second focal points of the ellipsoidal reflector surfaces coincide with each other and are located outside and in front of the cover lens. The cover lens has such optical properties that the light beams converging after reflection at the ellipsoidal reflector surfaces towards the coincided focal points are parallelized.

Furthermore, in EP-A-2 119 958 another lamp for a vehicle is disclosed.

Finally, WO-A-2006/092653 describes a high visibility emergency signaling light.

Accordingly, there is a need for an aircraft light providing a high and, in particular, a very high LED-based light intensity and flux in a very confined envelope.

SUMMARY OF THE INVENTION

The present invention provides a light for an aircraft, comprising
  a holder for carrying a plurality of light emitting diodes arranged along a curvilinear line and comprising light emitting sites for emitting light in a direction away from the curvilinear line,
  a first optical unit of a reflective type comprising a first reflector extending around the holder for reflecting light emitted from the light emitting diodes,
  wherein the first reflector comprises an elliptic reflective partial surface defining (i) a plurality of first focal points forming a first curvilinear focal line extending along the light emitting sites of the light emitting diodes, and (ii) a plurality of second focal points, wherein at least a portion of the elliptic reflective partial surface is arranged so as to face towards the light emitting diodes,
  a second optical unit of a reflective and/or refractive type for emitting light received from the first optical unit into a predetermined area,
  wherein the second optical unit comprises a single further focal point or a plurality of further focal points forming a further curvilinear focal line, and
  wherein the plurality of the second focal points of the first optical unit coincide and are identical to the single further focal point of the second optical unit or
  wherein the plurality of the second focal points of the first optical unit are located along the further curvilinear focal line of the second optical unit.

The aircraft light according to the present invention comprises two optical units, namely a reflective type first optical unit and a second optical unit which can be of a reflective and/or refractive type. The first optical unit comprises two focal points or focal lines. To this end, the first optical unit comprises a first reflector having at least in part an elliptic reflective surface. The elliptic reflective partial surface of the first reflector surrounds a holder carrying a plurality of light emitting diodes (LED) arranged along a curvilinear line, and, in particular, a circumferential portion of the holder facing away from the holder. Accordingly, the light emitting diodes emit their light in a direction away from the curvilinear line, i.e. radially and/or axially. Each light emitting diode comprises a light emitting site (namely e.g. a pn junction) which emits the light of the LED.

Due to the elliptic reflective partial surface, each section of the first reflector defines a first and a second focal point located on the primary chord, i.e. the major axis of the ellipse. Accordingly, the first reflector defines a plurality of first and second focal points with the first focal points, forming a first curvilinear focal line extending along the light emitting sites of the light emitting diodes. In other words, the light emitting sites are arranged in the first focal points.

The elliptic reflective partial surface is oriented such that the second focal points of the first reflector coincide so as to form a single second focal point or are arranged along a curvilinear line forming a second focal line.

In the light according to the present invention, each pair of a first and a second focal point is associated to a light emitting site of a light emitting diode. Generally, the light emitting site as such coincides with the first focal point of an elliptic reflective partial surface section of the first reflector. The partial ellipse belonging to the elliptic reflective partial surface defines a second focal point which is associated to the respective light emitting site. The light emitting sites and the associated respective second focal points are located on the chords of the ellipses wherein all the chords may intersect in a common and single second focal point. As an alternative, depending on the orientation of the elliptic reflective partial surface sections, the chords of the ellipses can intersect at sites between the respective two focal points associated to the chords or the chords can be oriented such that they do not intersect each other. In both of the latter two cases, the second focal points define a curvilinear focal line.

Preferably, the curvilinear lines mentioned before are of a circular shape, which means that the first reflector is rotationally symmetric.

The first optical unit defines a light emitting opening or interface to the second optical unit. The second optical unit normally comprises a single focal point but can also comprise additional further focal points. The second optical unit can be of the reflective type or of the refractive type or can be a combination of both so as to include reflective optical elements as well as refractive optical elements. For example, the second optical unit may comprise a reflector (elliptic, parabolic, spheric, concave or convex) or a lens (collimating or diverging lens) or can comprise both types of these elements.

The main idea on which the invention is based is the design of the first optical unit as an elliptical reflector of rotational shape. The first focal points of the elliptic partial surface sections are located in the LED optical center positions (i.e. in or adjacent to the light emitting sites, i.e. for example in the pn junctions) and the second focal points of the elliptical reflector act also as focal points or focal points for the second optical unit. The second optical unit preferably is provided as a parabolic or also elliptic reflector, a free-form reflector or a collimating or diverging lens. A fairly large distance between the LEDs and the second optical unit allows for a highly focused imaging optics. The maximum average distance between the LEDs and the second focal points of the first reflector can be achieved according to the invention by means of an ellipsoid which is tilted out of the vertical orientation and which in the tilted position is rotated around the vertical axis so as to form a very unique rotationally symmetrical hollow shape defining at its inner surface at least in part an elliptic reflective surface.

In the present invention, the second optical unit serves for parallelizing the diverging light beams after they have passed the focal point of the first optical unit. This means that the element covering the light exit opening of the light according to the invention has no imaging optical properties and, accordingly, can be a simple transparent cover without any surface structure optically effective.

The overall shape of the light according to the invention has a substantial dimension along the optical axis (i.e. a high profile structure) and is rather small in the direction perpendicular to the optical axis. The first and second optical units are arranged such that their coinciding focal points are located between both optical units. This results in a rather big lateral depth and a rather small width of the overall shape of the light according to the invention. According to another aspect of the present invention, in the light for an aircraft, maximum use is made of the available space envelope to create a projection of the LEDs capable of reaching extreme high light intensities. The benefit is a very high LED-based light intensity and flux in a very confined envelope. Also in the present invention it is possible to mix various color and combine various types of LEDs. The further benefit of the design according to the invention is that the ring-like structure allows for a very high number of LEDs which can be used and which could be of different type and color, creating a high light flux, with all of the LEDs creating a collimating beam on an axis if desired. This allows for variable colors of the light with the projected images all being in the identical target area—or maximum intensity when all LEDs are switched on. Furthermore, with the concept of using different type of LEDs, also LEDs of different types than those currently available can be employed in the future. Also, very small light output contours, i.e. of a beacon light, protruding from an air frame could be possible, which results in the reduction of any aerodynamic drag. Reading lights as well as all sorts of head lamps as well as beacon lights are feasible and can be designed based on the concept of the present invention.

In another embodiment of the present invention, the first reflector further comprises a spheric reflective partial surface adjacent the elliptic reflective partial surface. The spheric reflective surface portion is arranged underneath the holder of the LEDs. The center of the spheric reflective partial surface is identical to the first focal line of the first reflector, i.e. identical to the curvilinear line along which the LEDs and more specifically the light emitting sites of the LEDs are arranged. The spheric reflective partial surface starts at the intersection of the chord of the ellipse with the ellipse defined by the elliptic reflective partial surface. Designing this area of the first reflector spherically results in retro-reflecting light emitted from the LEDs back to the LEDs and from there via the elliptic reflective surface towards the second focal points of the first reflector. In other words, if the elliptic reflective surface would be continued beyond the intersection with the chord close to the LEDs, the holder carrying the LEDs would block any light emitted by the LEDs and reflected by that portion of the elliptic reflective surface. Therefore, designing this part of the first reflector as a spheric reflective surface results in obtaining more light being directed in the desired direction and light distribution area and, accordingly, increasing the overall efficiency of the light.

According to another aspect of the present invention, the first optical unit comprises a light exiting opening defined by an edge of the elliptic reflective partial surface wherein the light emitting diodes are arranged away from the opening as well as between the opening and the spheric reflective partial surface.

According to still a further embodiment of the present invention, the plurality of the second focal points of the first optical unit coincide so as to form a single second focal point, wherein the second optical unit comprises a second reflector which is parabolically shaped and defines a light emitting opening for emitting light into a predetermined area and/or with a predetermined light intensity distribution.

According to another aspect of the present invention, the plurality of the second focal points of the first optical unit form a second curvilinear focal line, wherein the second optical unit comprises a second reflector which is parabolically shaped and defines a light emitting opening for emitting light into a predetermined area and/or with a predetermined light intensity distribution.

According to a further embodiment of the present invention, the plurality of the second focal points of the first optical unit coincide so as to form a single second focal point, wherein the second optical unit comprises a convex spheric reflector for reflecting light received from the first optical unit in a circumferential area around the second optical unit.

According to another embodiment of the present invention, the plurality of the second focal points of the first optical unit form a second curvilinear focal line, wherein the second optical unit comprises an optical lens.

According to still a further aspect of the present invention, the optical lens is a collimating lens.

According to a further embodiment of the present invention, the second optical unit comprises a transparent cover through which light exits from the second optical unit.

According to another aspect of the present invention, the curvilinear line along which the light emitting diodes are arranged, the second curvilinear focal line of the first optical unit and the further curvilinear focal line of the second optical unit are all substantially circular.

According to still a further embodiment of the present invention, the light emitting diodes comprise light emitting diodes of the same or different colors and/or types.

The set-up according to the present invention allows for the addition of a second group of LEDs not included within the first reflector of the first optical unit. The second group of LEDs can be located within the second optical unit or outside both optical units. The LEDs of the second group contribute to a desired light intensity contribution (if necessary). The LEDs of the second group should be located such that they do not block light exiting the second optical unit but add to that light. The second group of LEDs can be used in combination with additional optical elements like TIR-based optical elements (Total Internal Reflection optical elements).

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION OF PREFERRED EMBODIMENTS

Figure 1:
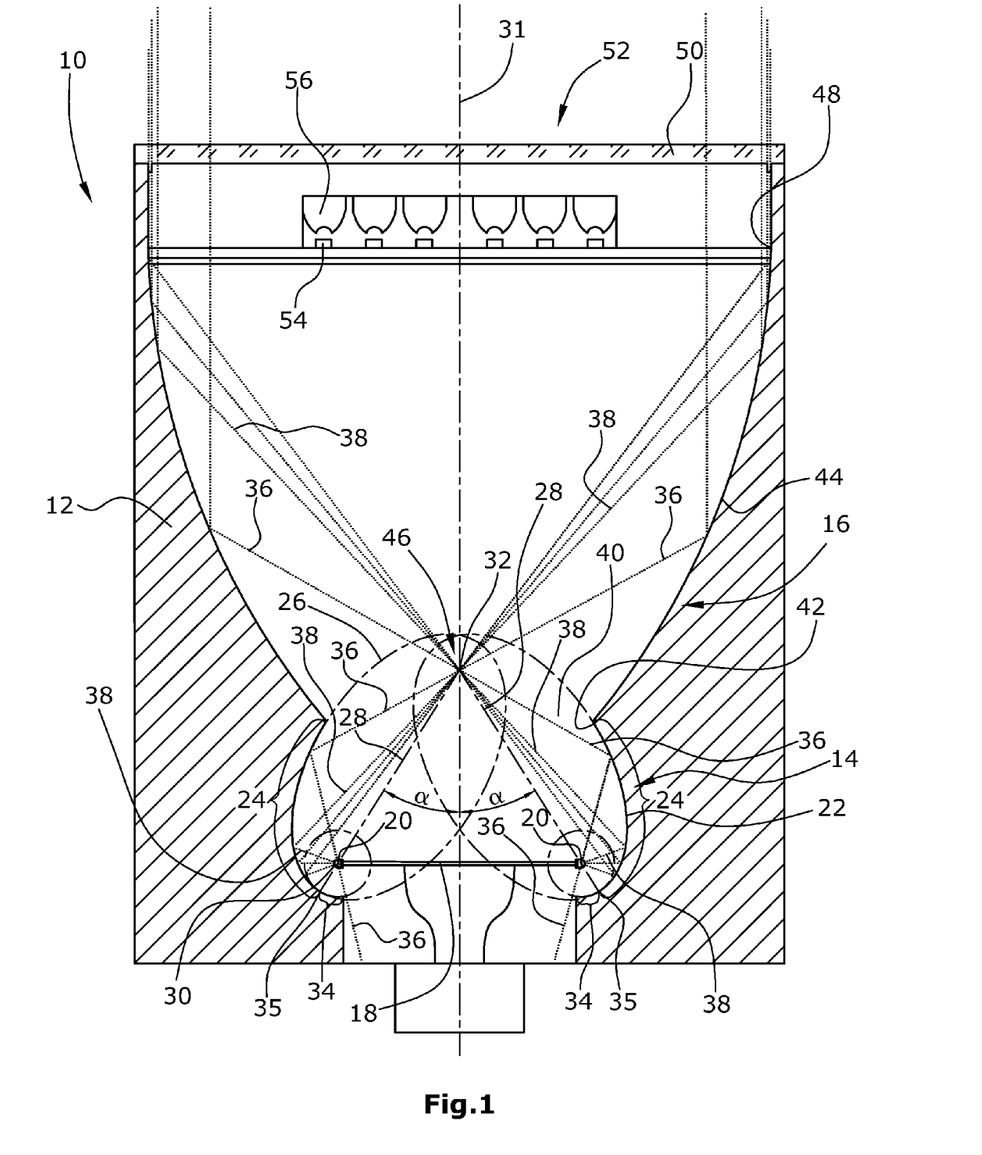
FIG. 1 a cross-section showing a light for an aircraft according to a first embodiment of the invention, FIG. 2 a cross-section along the optical axis of a second embodiment of the present invention, FIG. 3 a cross-sectional view of a further embodiment of the present invention, and FIG. 4 a cross-section through a fourth embodiment of the present invention.

In FIG. 1 a first embodiment of a aircraft light 10 is shown. In this embodiment, the aircraft light 10 is designed as a head lamp. The light 10 comprises a housing 12 defining a hollow space provided with a first and a second optical system 14,16.

The first optical system 14 is of the reflection type and comprises a holder 18 designed e.g. as a circular disk with a plurality of LEDs 20 arranged at the circumference of the disk 18. The LEDs 20 can be of the same type and the same color or can be different in type and color. The holder 18 is arranged within a first reflector 22 defined by two types of reflective partial surfaces formed at the inner surface of the hollow housing 12.

A first reflective surface of the first reflector 22 is elliptically shaped. This elliptical reflective partial surface 24 is spanned by a part of the circumference of an ellipse 26 which is inclined. Said ellipse 26 comprises an axis 28 or chord on which a first focal point 30 and a second focal point 32 are situated. Relative to the optical axis 31 of aircraft light 10, the ellipse 26 is inclined by the angle α. In case that, in this orientation the ellipse 26 rotates about the optical axis 31, the elliptic reflective partial surface 24 is spanned.

The first focal points 30 are located within the LEDs 20 and are arranged along a curvilinear line, in particular a circular line. In this embodiment the second focal points 32 coincide to form a single second focal point.

The second type of reflective surface of the first reflector 22 is spherically concavely shaped. This second reflective surface 34 extends beyond the intersection 35 of the major axis 28 with the elliptic reflective partial surface 24 and, in FIG. 1, is referenced by numeral 34. The second reflective surface 34 is formed as part of a circle with the LEDs 20 being the center of these circles. The circular shaped trough-like spheric reflective surface 34 extends around the optical axis 31 as a circular ring. Light emitted from the LEDs 20 towards the spheric reflective surface 34 is reflected back to the respective LED 20 and from there is directed towards the elliptic reflective partial surface 24 and from there towards the second focal point(s) 32 (see light ray 36 in FIG. 1). Light rays 38 emitted by the LEDs 20 directly towards the elliptic reflective partial surface 24 are reflected towards the second focal point(s) 32.

The first optical unit 16 defines a light exiting opening 40 through which there will exit all the light emitted by the LEDs 20 either directly or indirectly via reflections at the reflective surfaces of the first reflector 22. The opening 40 is limited by the edge 42 which also forms the boundary of the elliptic reflective partial surface 24.

In this embodiment according to FIG. 1, the second optical unit 16 is also of the reflective type and comprises a second reflector 44 which in this embodiment is parabolic.

The parabolic second reflector 44 has as its focal point 46 the second focal points 32 of the first optical unit 14. Accordingly, the light rays 36 and 38 shown in FIG. 1 are combined into light exiting the housing 12 in a direction parallel to the optical axis. The light emitting opening 48 of the housing 12 is covered by a transparent cover 50 and can further comprise a second group of light sources 52 having LEDs 54 and, as a specific feature of this embodiment, TIR-optical elements 56 associated to the individual LEDs 54. The second LEDs 54 provide additional light to the light emitted through the opening 48 of the housing 12 and the second LEDs provide an additional feature to the light 10 not necessary according to the present invention as far as the design of the housing 12 is related.

Figure 2:
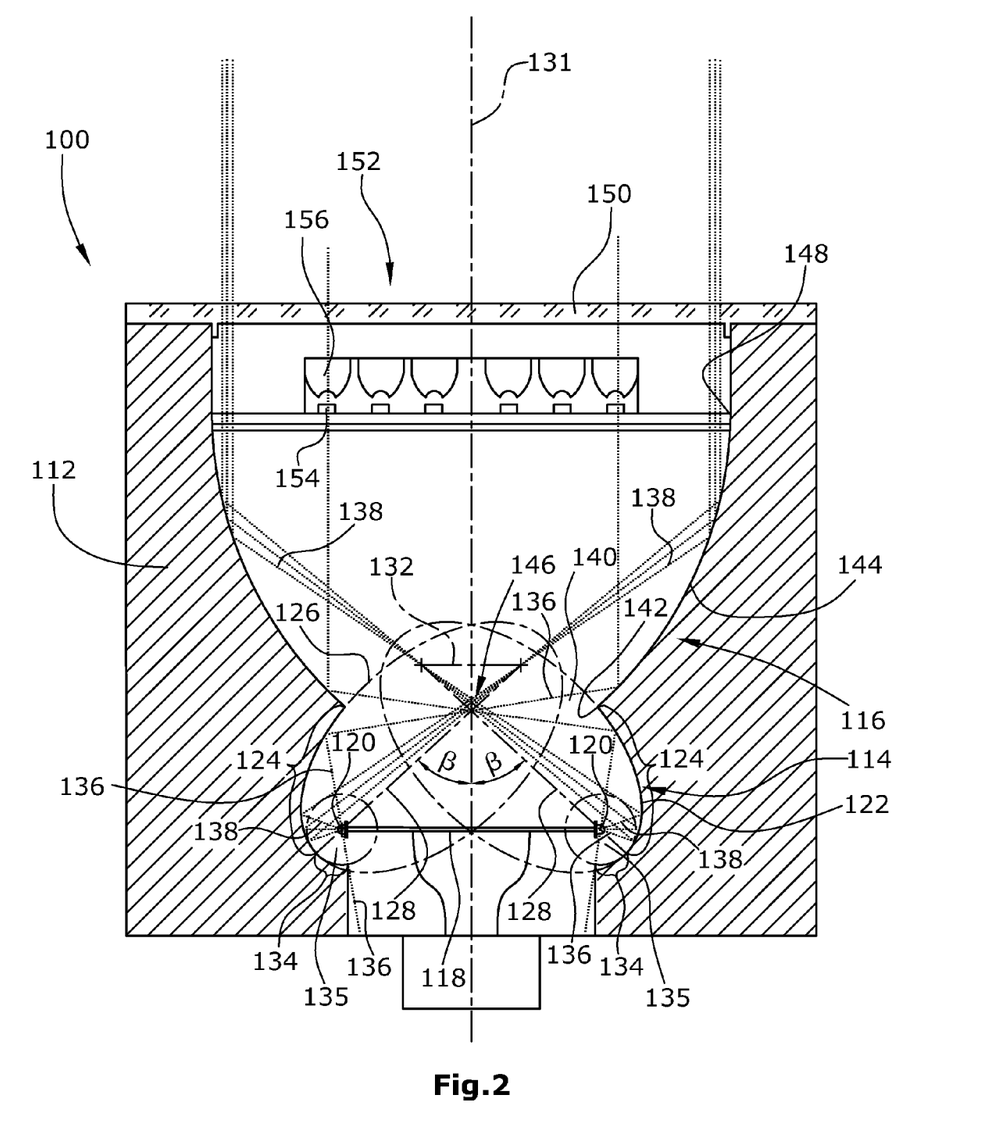

In FIG. 2 another embodiment of the invention is shown in cross-section. This embodiment is directed to a head lamp 110 for an aircraft. The light 110 comprises a housing 112 defining a hollow space provided with a first and a second optical system 114,116.

The first optical system 114 is of the reflection type and comprises a holder 118 designed e.g. as a circular disk with a plurality of LEDs 120 arranged at the circumference of the disk 118. The LEDs 120 can be of the same type and the same color or can be different in type and color. The holder 118 is arranged within a first reflector 122 defined by two types of reflective partial surfaces formed at the inner surface of the hollow housing 112.

A first reflective surface of the first reflector 122 is elliptically shaped. This elliptical reflective partial surface 124 is spanned by a part of the circumference of an ellipse 126 which is inclined. Said ellipse 126 comprises an axis 128 or chord on which a first focal point 130 and a second focal point 132 are situated. Relative to the optical axis 131 of aircraft light 110, the ellipse 126 is inclined by the angle β being e.g. greater than angle α according to FIG. 1 and wherein the axis 128 of the inclined ellipse 126 intersects the optical axis 131 at a location between the two focal points of the ellipse. In case that, in this orientation the ellipse 126 rotates about the optical axis 131, the elliptic reflective partial surface 124 is spanned.

The first focal points 130 are located within the LEDs 120 and are arranged along a curvilinear line, in particular a circular line. In this embodiment the second focal points 132 also form a circular line.

The second type of reflective surface of the first reflector 122 is spherically concavely shaped. This second reflective surface 134 extends beyond the intersection 135 of the major axis 128 with the elliptic reflective partial surface 124 and, in FIG. 2, is referenced by numeral 134. The second reflective surface 134 is formed as part of a circle with the LEDs 120 being the center of these circles. The circular shaped trough-like spheric reflective surface 134 extends around the optical axis 131 as a circular ring. Light emitted from the LEDs 120 towards the spheric reflective surface 134 is reflected back to the respective LED 120 and from there is directed towards the elliptic reflective partial surface 124 and from there towards the second focal point(s) 132 (see light ray 136 in FIG. 2).

Light rays 138 emitted by the LEDs 120 directly towards the elliptic reflective partial surface 124 are reflected towards the second focal point(s) 132.

The first optical unit 116 defines a light exiting opening 140 through which there will exit all the light emitted by the LEDs 120 either directly or indirectly via reflections at the reflective surfaces of the first reflector 122. The opening 140 is limited by the edge 142 which also forms the boundary of the elliptic reflective partial surface 124.

In this embodiment according to FIG. 2, the second optical unit 116 is also of the reflective type and comprises a second reflector 144 which in this embodiment is parabolic.

The parabolic second reflector 144 has as its focal point arrangement 146 the circular line of the second focal points 132 of the first optical unit 114. Accordingly, the light rays 136 and 138 shown in FIG. 2 are combined into light exiting the housing 112 in a direction parallel to the optical axis. The light emitting opening 148 of the housing 112 is covered by a transparent cover 150 and can further comprise a second group of light sources 152 having LEDs 154 and, as a specific feature of this embodiment, TIR-optical elements 156 associated to the individual LEDs 154. The second LEDs 154 provide additional light to the light emitted through the opening 148 of the housing 112 and the second LEDs provide an additional feature to the light 110 not necessary according to the present invention as far as the design of the housing 112 is related.

Figure 3:
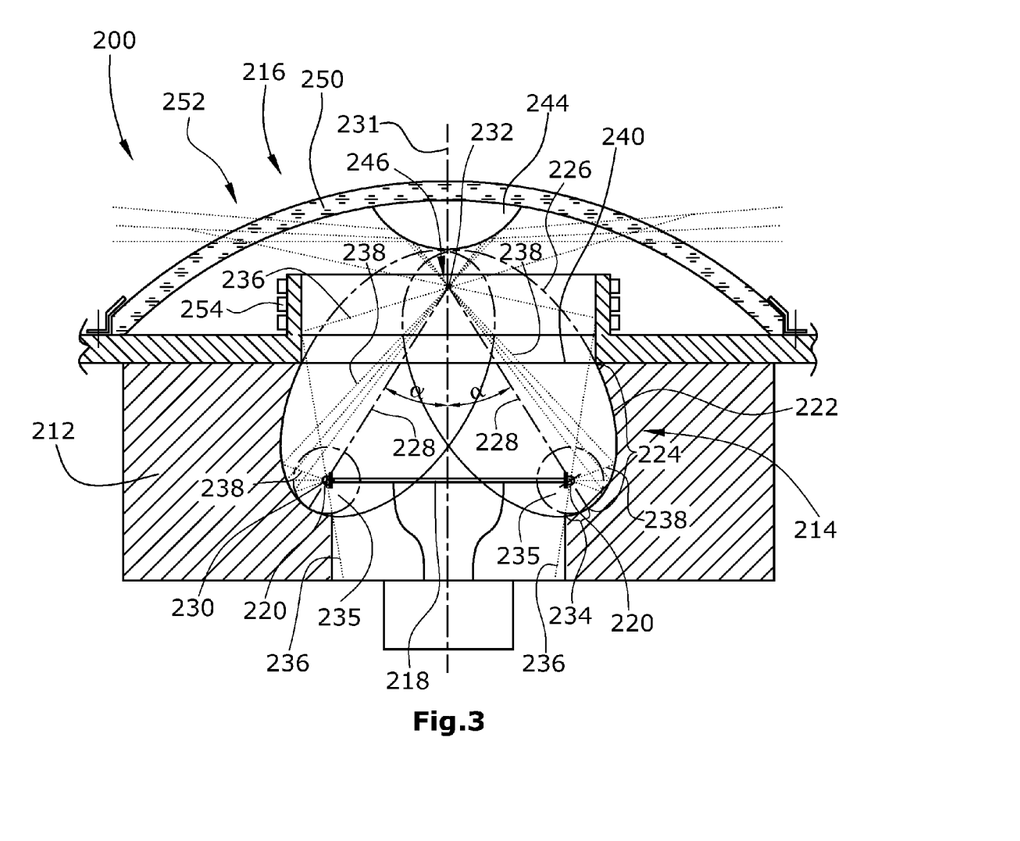

In FIG. 3 another embodiment of an aircraft light is shown which is designed as an anti-collision light 200. This aircraft light 200 comprises a housing 212 having a first optical 214 unit and a second optical unit 216 both of the reflective type.

The first optical system 214 is of the reflection type and comprises a holder 218 designed e.g. as a circular disk with a plurality of LEDs 220 arranged at the circumference of the disk 218. The LEDs 220 can be of the same type and the same color or can be different in type and color. The holder 218 is arranged within a first reflector 222 defined by two types of reflective partial surfaces formed at the inner surface of the hollow housing 212.

A first reflective surface of the first reflector 222 is elliptically shaped. This elliptical reflective partial surface 224 is spanned by a part of the circumference of an ellipse 226 which is inclined. Said ellipse 226 comprises an axis 228 or chord on which a first focal point 230 and a second focal point 232 are situated. Relative to the optical axis 231 of aircraft light 210, the ellipse 226 is inclined by the angle α. In case that, in this orientation the ellipse 226 rotates about the optical axis 231, the elliptic reflective partial surface 224 is spanned.

The first focal points 230 are located within the LEDs 220 and are arranged along a curvilinear line, in particular a circular line. In this embodiment the second focal points 232 coincide to form a single second focal point.

The second type of reflective surface of the first reflector 222 is spherically concavely shaped. This second reflective surface 234 extends beyond the intersection 235 of the major axis 228 with the elliptic reflective partial surface 224 and, in FIG. 3, is referenced by numeral 234. The second reflective surface 234 is formed as part of a circle with the LEDs 220 being the center of these circles. The circular shaped trough-like spheric reflective surface 234 extends around the optical axis 231 as a circular ring. Light emitted from the LEDs 220 towards the spheric reflective surface 234 is reflected back to the respective LED 220 and from there is directed towards the elliptic reflective partial surface 224 and from there towards the second focal point(s) 232 (see light ray 236 in FIG. 3).

Light rays 238 emitted by the LEDs 220 directly towards the elliptic reflective partial surface 224 are reflected towards the second focal point(s) 232.

The first optical unit 216 defines a light exiting opening 240 through which there will exit all the light emitted by the LEDs 220 either directly or indirectly via reflections at the reflective surfaces of the first reflector 222. The opening 240 is limited by the edge 242 which also forms the boundary of the elliptic reflective partial surface 224.

The second optical unit 216 comprises a convex spheric second reflector 244 located opposite to the light exit opening 240 of the first optical unit 214. Light extending through the second focal points 232 of the first optical unit 214 impinges onto the spheric second reflector 244 and is reflected radially outwardly into the circumferential area around the light 200. A transparent cover 250 is provided for closing the opening 240 and for carrying the spheric reflector 244. The type of aircraft light 200 shown in FIG. 3 can be used as a beacon or anti collision light.

As also shown in FIG. 3, underneath the cover 252 there can be arranged a ring-like holder having second LEDs 254 at its outer circumferential surface in order to add further light to the radially emitting light coming from the LEDs 220. In addition to the second LEDs 254, optical elements like e.g. TIR optical elements can be used.

Figure 4:
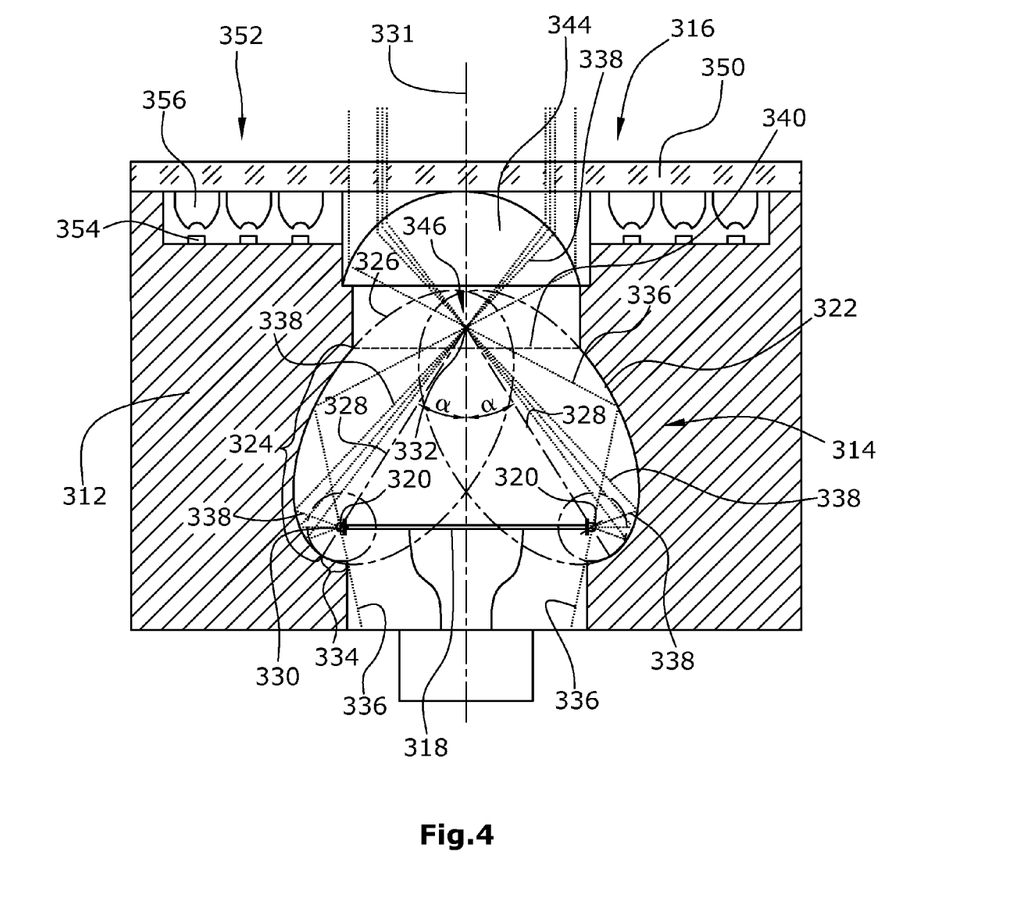

In FIG. 4 a further embodiment of the present invention is shown. It comprises a first optical unit 314 of the reflective type and a second optical unit 316 of the refractive type.

The first optical system 314 is of the reflection type and comprises a holder 318 designed e.g. as a circular disk with a plurality of LEDs 320 arranged at the circumference of the disk 318. The LEDs 320 can be of the same type and the same color or can be different in type and color. The holder 318 is arranged within a first reflector 322 defined by two types of reflective partial surfaces formed at the inner surface of the hollow housing 312.

A first reflective surface of the first reflector 322 is elliptically shaped. This elliptical reflective partial surface 324 is spanned by a part of the circumference of an ellipse 326 which is inclined. Said ellipse 326 comprises an axis 328 or chord on which a first focal point 330 and a second focal point 332 are situated. Relative to the optical axis 331 of aircraft light 310, the ellipse 326 is inclined by the angle α. In case that, in this orientation the ellipse 326 rotates about the optical axis 331, the elliptic reflective partial surface 324 is spanned.

The first focal points 330 are located within the LEDs 320 and are arranged along a curvilinear line, in particular a circular line. In this embodiment the second focal points 332 coincide to form a single second focal point.

The second type of reflective surface of the first reflector 322 is spherically concavely shaped. This second reflective surface 334 extends beyond the intersection 335 of the major axis 328 with the elliptic reflective partial surface 324 and, in FIG. 4, is referenced by numeral 334. The second reflective surface 334 is formed as part of a circle with the LEDs 320 being the center of these circles. The circular shaped trough-like spheric reflective surface 334 extends around the optical axis 331 as a circular ring. Light emitted from the LEDs 320 towards the spheric reflective surface 334 is reflected back to the respective LED 320 and from there is directed towards the elliptic reflective partial surface 324 and from there towards the second focal point(s) 332 (see light ray 336 in FIG. 4). Light rays 338 emitted by the LEDs 320 directly towards the elliptic reflective partial surface 324 are reflected towards the second focal point(s) 332.

The first optical unit 316 defines a light exiting opening 340 through which there will exit all the light emitted by the LEDs 320 either directly or indirectly via reflections at the reflective surfaces of the first reflector 322. The opening 340 is limited by the edge 342 which also forms the boundary of the elliptic reflective partial surface 324.

The second optical unit 316 in the light 300 of FIG. 4 comprises a collimating lens 344 having its focal point 346 coinciding with the second focal point(s) 332 of the first reflector 322. The collimating lens 344 refracts the light of the LEDs 320 so as to direct this light in parallel to the optical axis 330.

Outside the light beams there can be provided additional light sources 352 which can be designed as LEDs 354 in combination with TIR optical elements 356. The housing 312 can be closed by a transparent cover 350 as shown in FIG. 4.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A light for an aircraft, comprising a holder (18,118,218, 318) for carrying a plurality of light emitting diodes (20,120, 220,320) arranged along a curvilinear line and comprising light emitting sites for emitting light in a direction away from the curvilinear line,
a first optical unit (14,114,214,314) of a reflective type comprising a first reflector (22,122,222,322) extending around the holder (18,118,218,318) for reflecting light emitted from the light emitting diodes (20,120,220,320),
wherein the first reflector (22,122,222,322) comprises an elliptic reflective partial surface defining (i) a plurality of first focal points (30,130,230,330) forming a first curvilinear focal line extending along the light emitting sites of the light emitting diodes (20,120,220,320), and (ii) a plurality of second focal points (32,132,232,332), wherein at least a portion of the elliptic reflective partial surface (24,124,224,324) is arranged so as to face towards the light emitting diodes (20,120,220,320),
a second optical unit (16,116,216,316) of at least one of a reflective or refractive type for emitting light received from the first optical unit (14,114,214,314) into a predetermined area, wherein the second optical unit (16, 116,216,316) comprises a single further focal point or a plurality of further focal points forming a further curvilinear focal line, and
wherein the plurality of the second focal points (32,132, 232,332) of the first optical unit (14,114,214,314)
either coincide and are identical to the single further focal point of the second optical unit (16,116,216,316)
or are located along the further curvilinear focal line of the second optical unit (16,116,216,316);
wherein the first reflector (22,122,222,322) further comprises a spheric reflective partial surface (34,134,234, 334) adjacent the elliptic reflective partial surface and extending from a portion thereof facing the light emitting diodes (20,120,220,320).

2. The light according to claim 1, wherein the first optical unit (14,114,214,314) comprises a light exiting opening defined by an edge of the elliptic reflective partial surface.

3. The light according to claim 2, wherein the light emitting diodes (20,120,220,320) are arranged away from the light exiting opening as well as between the opening and the spheric reflective partial surface.

4. The light according to claim 1, wherein the plurality of the second focal points (32,132,232,332) of the first optical unit (14,114,214,314) coincide so as to form a single second focal point (32,132,232,332) and wherein the second optical unit (16,116,216,316) comprises a second reflector (44,144, 244) which is parabolically shaped and defines a light emitting opening for emitting light into at least one of a predetermined area or and/or with a predetermined light intensity distribution.

5. The light according to claim 1, wherein the plurality of the second focal points (32,132,232,332) of the first optical unit (14,114,214,314) form a second curvilinear focal line and wherein the second optical unit (16,116,216,316) comprises a second reflector which is parabolically shaped and defines a light emitting opening for emitting light into at least one of a predetermined area or with a predetermined light intensity distribution.

6. The light according to claim 1, wherein the plurality of the second focal points (32,132,232,332) of the first optical unit (14,114,214,314) coincide so as to form a single second focal point (32,132,232,332) and wherein the second optical unit (16,116,216,316) comprises a convex spheric reflector for reflecting light received from the first optical unit (14,114, 214,314) in a circumferential area around the second optical unit (16,116,216,316).

7. The light according to claim 1, wherein the plurality of the second focal points (32,132,232,332) of the first optical unit (14,114,214,314) form a second curvilinear focal line and wherein the second optical unit (16,116,216,316) comprises an optical lens (344).

8. The light according to claim 7, wherein the optical lens is a collimating lens (344).

9. The light according to claim 1, wherein the second optical unit (16,116,216,316) comprises a transparent cover through which light exits from the second optical unit (16, 116,216,316).

10. The light according to claim 1, wherein the curvilinear line along which the light emitting diodes (20,120,220,320) are arranged, the second curvilinear focal line of the first optical unit (14,114,214,314) and the further curvilinear focal line of the second optical unit (16,116,216,316) are all substantially circular.

11. The light according to claim 1, wherein the light emitting diodes (20,120,220,320) comprise light emitting diodes of the same or different colors or types.

12. A light for an aircraft, comprising a holder (18,118,218, 318) for carrying a plurality of light emitting diodes (20,120, 220,320) arranged along a curvilinear line and comprising light emitting sites for emitting light in a direction away from the curvilinear line,
a first optical unit (14,114,214,314) of a reflective type comprising a first reflector (22,122,222,322) extending around the holder (18,118,218,318) for reflecting light emitted from the light emitting diodes (20,120,220,320),
wherein the first reflector (22,122,222,322) comprises an elliptic reflective partial surface defining (i) a plurality of first focal points (30,130,230,330) forming a first curvilinear focal line extending along the light emitting sites of the light emitting diodes (20,120,220,320), and (ii) a plurality of second focal points (32,132,232,332), wherein at least a portion of the elliptic reflective partial surface (24,124,224,324) is arranged so as to face towards the light emitting diodes (20,120,220,320), a second optical unit (16,116,216,316) of at least one of a reflective or refractive type for emitting light received from the first optical unit (14,114,214,314) into a predetermined area, wherein the second optical unit (16, 116,216,316) comprises a single further focal point or a plurality of further focal points forming a further curvilinear focal line, and wherein the plurality of the second focal points (32,132, 232,332) of the first optical unit (14,114,214,314)

either coincide and are identical to the single further focal point of the second optical unit (16,116,216,316)

or are located along the further curvilinear focal line of the second optical unit (16,116,216,316);

wherein a second group of light emitting diodes (54,154, 254,354) is located within an area outside of the area through which light from the second optical unit (16, 116,216,316) exits and wherein the light emitting diodes (54,154,254,354) of the second group emit additional light directed into a predetermined area.

* * * * *